Oct. 25, 1932.    J. ROBERT    1,884,250
GRAPHIC INDICATOR FOR CONTINUOUS FELT WEIGHING SCALES
Filed Aug. 30, 1928
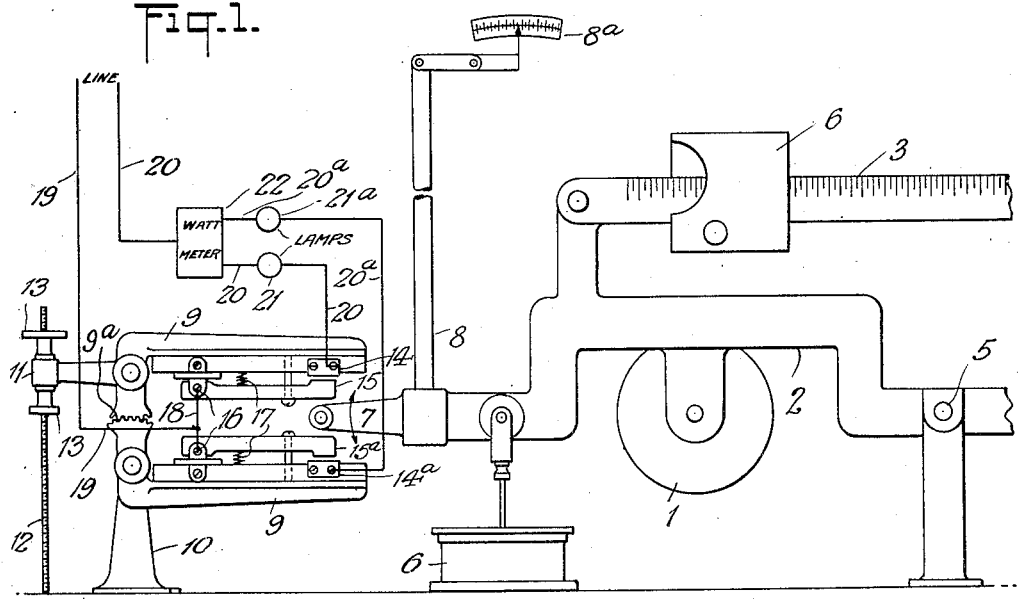
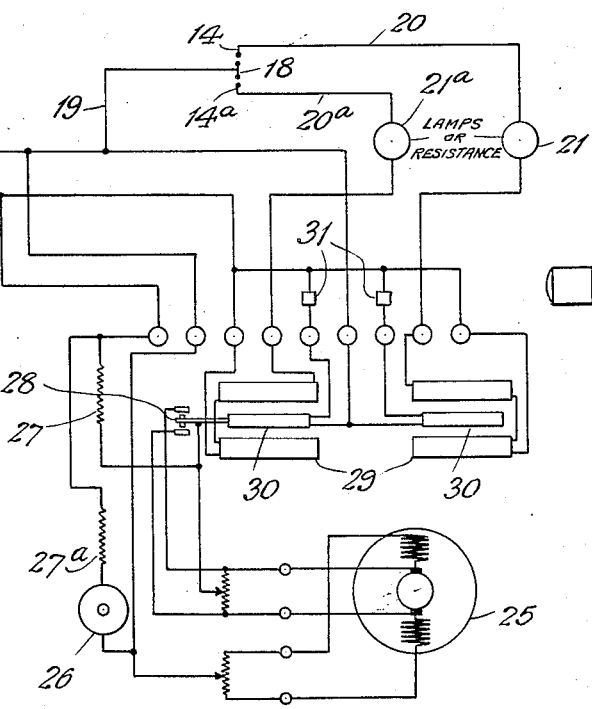
INVENTOR
JOHN ROBERT,
BY Forbes Sileby
ATTORNEY Patented Oct. 25, 1932

1,884,250

UNITED STATES PATENT OFFICE

JOHN ROBERT, OF CHICAGO, ILLINOIS, ASSIGNOR TO THE BARRETT COMPANY, OF NEW YORK, N. Y., A CORPORATION OF NEW JERSEY

GRAPHIC INDICATOR FOR CONTINUOUS FELT WEIGHING SCALES

Application filed August 30, 1928. Serial No. 302,993.

My invention relates to continuous weighing devices which are particularly adapted to indicate and permanently record any variance in weight of continuous lengths of sheet material.

It has been the practice in continuous weighing scales to pass the material being weighed over a weighing roll connected to a balance beam pivoted upon a knife edge, the beam being counterbalanced and dampened by the usual means, the movement of the beam being restrained within certain limits by suitable stops. The beam is constructed and arranged to actuate a pointer playing on a scale to indicate the position of the beam and to cooperate with the stops to close one or more electric circuits to a plurality of lamps to indicate the extreme positions of the beam and consequently predetermined variations in the weight of the material passing over the weighing roll.

Scales of this type give a very accurate indication of any variance above or below allowable limits but do not give any permanent record of variations in the weight of the material being measured. It has long been realized that a permanent record is desirable and particularly a record that will reveal the weight or differences therein at certain known times or certain locations in the material being weighed. Many attempts have been made to construct such a scale but all prior devices so constructed, to my knowledge, have affected the accuracy, sensitivity or speed of the scale.

It is the purpose of my invention to provide a continuous scale which will not only weigh the material and give a visual indication of the scale determinations but which will also permanently record the measurements of the scale without affecting the accuracy, sensitiveness or speed of operation. In accordance with my invention I construct a continuous reading scale which may or may not have a visual pointer indicating the position of the beam or lever but which does have a visual indicator such as two differently colored lights to indicate the two extreme positions of the lever as limited by a pair of stops. With a scale having one or both of these features I combine a recording meter such as a recording wattmeter and incorporate the same in the scale to record the electrical power consumed or current flowing through the two indicating lamps. The meter is arranged to record a straight line if neither lamp is burning, and to record a line varying from one side of the center to the other according to which lamp is burning. In this manner a permanent record will be made representing the weight of the material and variations thereof at determinable locations along the material.

A better understanding of my invention will be had from the detailed description given in connection with the drawings in which:

Fig. 1 is a side elevation of a portion of a scale and illustrating one embodiment of my invention, Fig. 2 is a diagram of the electrical connections of a scale embodying my invention, and Fig. 3 is a diagrammatic illustration of a preferred type of recording mechanism.

In the apparatus shown the material to be weighed passes over the weighing roll 1 which is rotatably supported in the arm or beam 2 having the usual counter arm 3 and adjustable counter weight 4. The beam is pivoted upon a fixed knife edge support 5 and adjacent one end is connected to the usual damper 6 at which end the beam terminates into a finger 7. If desired a rod 8 may be attached to this same end of the beam and utilized to actuate a pointer 8a to indicate the position of the beam. A pair of adjustable contact jaws 9 are mounted upon a pedestal 10 so that the free end of one jaw overlies the end of the finger 7 and the other underlies the same. The jaws are pivoted to the pedestal and have their ends turned toward each other and terminating in tooth segments 9a which engage each other so that rotation of one jaw about its pivot will rotate the other. The upper arm is provided with a projection 11 which engages a threaded rod 12 having knurled nuts 13 above and below the projection to adjust the space between the ends of the jaws. The free ends of the jaws are provided with stationary contacts 14 and 14a adapted to engage the ends of movable contact arms 15 and 15a pivotally secured to and insulated from the jaws 9 at 16, the contact arms being continuously urged away from contacts 14 by means of springs 17. Arms 15 and 15a are electrically connected together by a connector 18 and to one side of a source of current by a wire 19. Contact 14 is connected to the other side of the line by wire 20 including a lamp 21 and a recording wattmeter 22 in the circuit. Contact 14a is also connected to the latter mentioned side at the line by a wire 20a including a lamp 21a and the same wattmeter 22 in the circuit.

The electrical connections to the recording wattmeter which is of standard construction are better illustrated in Fig. 2 which shows diagrammatically a polyphase wattmeter having a control motor 25, clock motor 26, clock resistance 27a, series resistance 27, moving contact 28, current coils 29, potential coils 30, and potential resistances 31. It is obvious that if it is desired to eliminate the lamps any resistance element may be substituted therefor.

In operation the material to be weighed is caused to pass over the weighing roll and the counterweight is adjusted to balance the beam at any predetermined weight. The contact jaws are also adjusted with proper clearance therebetween to cause the contacts to close whenever the predetermined amount of tolerance has been exceeded. As long as the material which passes over the weighing roll does not exceed the tolerance for which the scale is set the wattemeter will record a straight line since the contacts 14, 14a and 15 and 15a will not touch but as soon as the tolerance is exceeded either contact 14 and 15 or 14a aid 15a will be closed by action of finger 7 and establish a circuit through either lamp 21 or 21a and cause the meter to deviate from a straight line.

From the foregoing it is obvious that I have provided a scale which will give a permanent record of any deviations in weight for which the scale is set and which will do so with unfailing accuracy and without any diminution in sensitiveness since the energy for actuating the recording mechanism is not derived from nor attached to the beam but is merely controlled by movement of the beam without adding work to be done thereby.

It is obvious that minor changes may be made from the illustrated form of my invention without departing from the principles thereof as defined by the appended claims.

I claim:

1. In apparatus for continuously recording variations in weight of a sheet of material of indeterminate length, a weighing member over which the sheet of material to be weighed may pass, a balance beam operatively connected thereto, a plurality of electrical contacts controlled by said beam, a circuit connecting said contacts to a source of current and means for recording the current flowing through said circuit as the sheet material to be weighed passes over said member.

2. In apparatus for continuously recording variations in weight of a sheet of material of indeterminate length, a weighing member over which the sheet of material to be weighed may pass, a balance beam operatively connected thereto, electrical contacts controlled by said beam, a circuit connecting said contacts to a source of current, a visual indicator in said circuit, and means for recording the current flowing through said circuit as the sheet material to be weighed passes over said member.

3. In apparatus for continuously recording variations in weight, the combination with a movable support over which the material to be weighed is arranged to pass, of weighing mechanism for balancing the weight of the material on the support comprising a weighing beam connected to said movable support and an adjustable counterweight thereon, means operative thereby for closing alternative electric circuits as said beam moves in accordance with the variations of weight of the material passing over said member and means for recording the current flowing alternatively through said electric circuits.

4. In apparatus for continuously recording variations in weight, the combination with a movable support over which the material to be weighed is arranged to pass, of weighing mechanism for balancing the weight of the material on the support comprising a weighing beam connected to said movable support and an adjustable counterweight thereon, means operative thereby for closing alternative electric circuits as said beam moves in accordance with the variations of weight of the material passing over said member, means for recording the current flowing alternatively through said electric circuits, and a plurality of indicator signals in said circuits.

5. In apparatus for continuously recording variations in weight of sheet material, a weighing member over which the sheet material is passed, a balance beam operatively connected to said weighing member, a plurality of electrical contacts controlled by said beam, a circuit connecting said contacts to a source of current and means in said circuit actuated by variations in the current flowing through said circuit to give a permanent record of the character and location in said sheet material of deviations in the weight of the material beyond predetermined limits.

6. In apparatus for continuously recording variations in weight of a moving sheet of material of indeterminate length, a weighing member over which a sheet of material to be weighed is passed, a balance beam operatively connected thereto, a recording device movable to inscribe a permanent record of variations in weight of the sheet of material as it passes over said member, a source of energy independent of the balance beam for operating said recording device, and means controlled by said balance beam for actuating said source of energy.

7. In apparatus for continuously recording variations in weight of a moving sheet of material of indeterminate length, a weighing member over which a sheet of material to be weighed is passed, a balance beam operatively connected thereto, a recording device movable to inscribe a permanent record of the character and location of variations in weight of the sheet of material as it passes over said member, an electrical circuit for operating said recording device, and means actuated by movement of said balance beam controlling said electrical circuit.

8. In apparatus for continuously recording variations in weight of a moving sheet of material of indeterminate length, a weighing member over which a sheet of material to be weighed is passed, a balance beam operatively connected thereto, a recording device movable to inscribe a permanent record of the character and location of variations in weight of the sheet of material as it passes over said member, a source of energy independent of the balance beam for operating said recording device, means controlled by said balance beam for actuating said source of energy, and means independent of said recording device for indicating the character of variations in weight of said sheet above or below predetermined limits as the sheet of material passes over said weighing member.

JOHN ROBERT.